May 24, 1932. C. A. ANDERSON 1,859,860
RESISTANCE MEASURING APPARATUS
Filed July 2, 1928
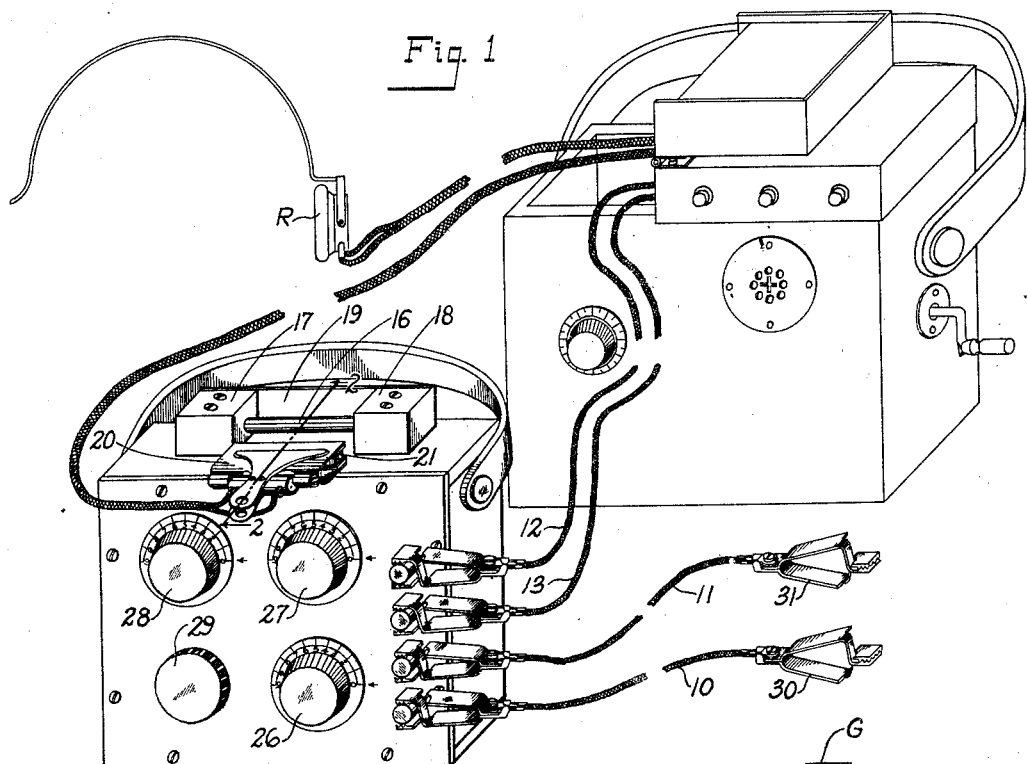
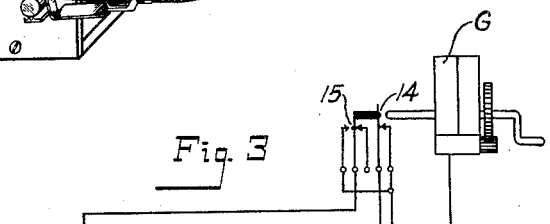
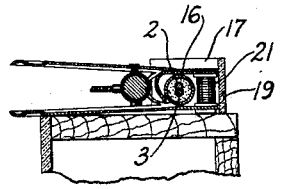
Inventor
Clarence A. Anderson
R C Richardson Atty.

Patented May 24, 1932

1,859,860

UNITED STATES PATENT OFFICE

CLARENCE A. ANDERSON, OF CHICAGO, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

RESISTANCE MEASURING APPARATUS

Application filed July 2, 1928. Serial No. 289,720.

This invention pertains in general to the apparatus for measuring electrical resistance; and the object of the invention is the production of new and improved resistance measuring apparatus in which what I term as the inductive balancing method is used. By this method, an alternating current from a common source is caused to flow in a circuit including the conductor the resistance of which is to be measured, and also in a test circuit including calibrated variable resistances. A section of each circuit is caused to influence a magnetic circuit, the influence of one being opposite to that of the other, so that when the currents in both sections are equal, the effects of the two currents together on the magnetic circuit will be zero. To measure the resistance of the conductor, therefore, the variable resistance included in the test circuit is varied until the currents in the two circuits are equal, this being determined by suitable inductive detecting means. When this balance has been obtained, the resistance inserted in the test circuit is a measure of the resistance of the conductor.

Since a hand generator or magneto may be used as the source of alternating current for resting resistances by this method, the apparatus for measuring resistances by this method may readily be mounted in a portable case, and in this form be particularly useful to service men or line men for testing resistances on telephone lines, on telegraph lines, of rail bonds, etc., out in the field. In my Patent No. 1,778,207, granted October 14, 1930, a portable test set such as is used by line men for locating faults on telephone and telegraph lines is shown and described. A set of this kind includes a hand generator, a receiver, and a finder coil. I have therefore illustrated my present invention in the form of an auxiliary portable set to be used in connection with a test set such as is disclosed in the above reference, in which case the generator, receiver, and finder coil of the test set may be used with the auixiliary set as part of the resistance measuring equipment. The generator of the test set may be used to furnish the alternating current, and the receiver and finder coil may be used as the means for detecting the inductive balance. The auxiliary set itself then need consist of only a small case housing very little additional apparatus.

The invention including its various features is described in the following specification with the aid of the accompanying drawings forming a part thereof. In Fig. 1, the auxiliary set and also the line man's test set with the proper connections between them is shown. In Fig. 2 a section along the line 2—2 of part of the auxiliary set with the finder coil of the line man's test set in position is shown. In Fig. 3, a circuit diagram of the auxiliary set and that part of the test set which cooperates with the auxiliary is shown.

The auxiliary set itself consists of three calibrated resistances 6, 7, and 8, and a potentiometer 9 mounted in a small portable case. Suitable control dials 26, 27, 28, and 29 are provided on the outside of the case for controlling the resistances 6, 7, 8, and the potentiometer 9, respectively. On the top of the case, a tube 16 is mounted between two supporting blocks. Within the tube 16, two parallel wires 2 and 3 insulated from each other are imbedded. A strip 19 extends from one block to the other on the back side of the blocks. The tube 16 is so positioned between the two mounting blocks and the back strip, that the finder 20 of the line man's test set may be clamped in the position shown in Fig. 2, and when so positioned the finder is held substantially fixed. The space between the under side of the tube 16 and the top of the case is just sufficient to allow the bottom jaw of the finder 20 to slip underneath, and the space between the back strip and the tube will accommodate the coil 21 of the finder rather snugly. The distance between the supporting blocks is slightly larger than the width of the finder. This arrangement also makes it impossible to clamp the finder around the tube in any but the position shown. The two wires in the tube are positioned one directly above the other very close together, so that both will be substantially the same distance from the winding of the coil when the coil is in position. Four binding posts are provided on the case, two to accommodate the generator leads 12 and 13 from the test set, and two for making connections with the line or conductor whose resistance is to be measured, this being done by means of two flexible leads 10 and 11 provided with suitable connecting clips 30 and 31.

The use of the auxiliary set in connection with a line man's test set to measure the resistance of a conductor is as follows:

The finder 20 of the test set is clamped around the tube 16 of the auxiliary set; the generator leads 12 and 13 from the test set are connected to the generator binding posts; and the testing leads 10 and 11 are connected to the testing binding posts. Before the testing leads are connected to the conductor whose resistance is to be measured, a zero adjustment is first made by means of the potentiometer. This is done by connecting the two clips 30 and 31 of the testing leads together, turning all three resistances 6, 7, and 8, to zero, then operating the generator G, and then turning the potentiometer 9 in one direction or the other until no tone is heard in the receiver R.

Operating the generator G, which causes the contacts 13 and 14 to close, causes current to traverse two parallel circuits, one circuit including the elements G, 12, 9, 2, 6, 7, 8, 13, and 14, and the other including elements G, 12, 9, 3, 10, 30, 31, 11, 13, and 14. By moving the potentiometer 9, the resistance of one of these circuits is increased while the resistance of the other one is decreased. When the two circuits are of equal resistance, the currents in the two conductors 2 and 3 will be equal, in which case the inductive influence of one conductor on the coil 21 of the finder 20 will be exactly equal to and opposite to that of the other conductor, both being the same distance from the coil 21. Therefore no current will be induced in the winding 21 of the finder 20 and as a result no tone will be heard in the receiver R. But until the currents in the two conductors 2 and 3 are equal, that is, until the resistances of the two circuits are equal, current will be induced in the coil 21, which will produce a tone in the receiver R.

Having determined the proper position of the potentiometer 9 for the correct zero readings, the clips 30 and 31 of the testing leads are now connected to the conductor whose resistance is to be measured. Then the generator G is again operated and now the resistances 6, 7, and 8 are set until no tone is heard in the receiver R. This effect will again be produced when the resistances of the two circuits are exactly equal, that is, when resistances 6, 7, and 8 have been adjusted to equal the resistance of the conductor whose resistance is being measured. The readings on the dials then give the correct value of the resistance of this conductor.

While I have described my invention in the form of an auxiliary set to be used in connection with a line man's test set, having a generator, a receiver, and a finder, the auxiliary equipment may readily be incorporated in the same case with a test set. Or should it be desirable to provide a set merely for testing resistances, there would be no need of having the finder coil element removable, and in such case a transformer having two primary windings and one secondary winding may be substituted for the tube and the finder coil, one of the primary windings taking the place of the conductor 2 and the other primary winding taking place of conductor 3, and the secondary winding taking the place of the finder coil.

When the equipment is used for testing the resistance of rail bonds, copper wire brushes with means for clamping them to the top of the rail may be substituted for the clips 30 and 31 so that good contacts with the rails may be obtained. In making the zero reading adjustment in this case, the resistance of the connections to the rail may be compensated for by making the zero adjustment with the two brushes on the rail on the same side of the bond, and then transferring one brush to the other side to take the resistance reading. The reading will then be the true resistance of the bond.

What is claimed is:

1. In a resistance testing system, a portable case housing calibrated resistances, a tube mounted on said case housing two parallel wires, and circuit connections for connecting a source of fluctuating current to said calibrated resistances in series with one wire and to the other wire in series with an unknown resistance, the connections to the two wires being such that the currents therein are opposite in direction so that value of the currents may be compared by induction means.

2. In combination, a calibrated variable resistance with circuit connections for connecting it to a source of fluctuating current, other circuit connections for connecting an unknown resistance to the same source of fluctuating current, variable means for simultaneously adding resistance to one of said circuit connections and removing resistance from the other of said circuit connections to equalize the resistance of the two circuit connections when the variable resistance is reduced to zero and the unknown resistance is excluded, and induction means for determining when the currents in the two circuit connections are equal.

3. In combination, a calibrated variable resistance with circuit connections for connecting it to a source of fluctuating current, other circuit connections for connecting an unknown resistance to the same source of fluctuating current, a potentiometer at the junction of the two circuit connections for equalizing the resistances of the two circuit connections, and induction means for determining when the currents in the two circuit connections are equal.

4. An auxiliary set for use in connection with a test set comprising a generator and a finder coil; said auxiliary set comprising a variable resistance with circuit connections for connecting the variable resistance with said generator, other circuit connections for connecting an unknown resistance with said generator, and two conductors, one included in one of said circuit connections and the other in the other of said circuit connections, and an enclosure for holding said conductors, said enclosure being of such dimensions that said finder coil may be magnetically coupled with said conductors for determining when the currents in the two conductors are equal.

5. An auxiliary set for use in connection with a test set comprising a generator and a finder coil; said auxiliary set comprising a variable resistance with circuit connections for connecting the variable resistance with said generator, other circuit connections for connecting an unknown resistance with said generator, and two conductors, one included in one of said circuit connections and the other in the other of said circuit connections, and an enclosure for holding said conductors, said enclosure being of such dimensions that said finder coil may be magnetically coupled with said conductors for determining when the currents in the two conductors are equal, said conductors being positioned in said enclosure in such a manner that both will be substantially the same distance from the winding of the finder coil when the latter is coupled with said conductors.

6. An auxiliary set for use in connection with a line man's test set comprising a generator and a finder coil for measuring resistances; said auxiliary set including two circuits, a section of each passing through a tube about which the finder coil of the test set may be coupled, and an enclosure about the tube for causing said finder coil to always assume the same position each time it is coupled with the tube.

7. An auxiliary set for use in connection with a line man's test set comprising a generator and a finder coil for measuring resistances; said auxiliary set including two circuits, a section of each passing through a tube about which the finder coil of the test set may be coupled, and barriers for preventing the finder coil from being coupled with the tube except in one particular position.

8. The combination with a portable line man's test set for determining the direction of a fault on a line from any given position, of an auxiliary portable set including a resistance of known value to be used in conjunction with the portable line man's test set, means in the auxiliary set for directly comparing said known resistance with the line for measuring the resistance of the line and fault from the given position, and circuit connections for operatively connecting said sets.

9. The combination with a portable line man's test set comprising a finder coil; receiver, and generator for determining the direction of a fault on a line from any one position, of an auxiliary portable set including a resistance of known value and an induction balance for use with the finder and receiver and generator of the test set in inductively comparing said known resistance with the line to measure the resistance of the line and fault from the said one position, and conductors for temporarily connecting said sets.

10. An auxiliary resistance measuring set for use in connection with a lineman's test set comprising a generator and a finder coil, two circuits included in said auxiliary set, and a supporting member for rigidly holding a section of each of said circuits with which the finder coil of said test set may be connected.

11. An auxiliary resistance measuring set for use in connection with a lineman's test set comprising a generator and a finder coil, two circuits included in said auxiliary set with which the finder coil of said test set may be inductively coupled, and a guiding member for limiting the coupling of said finder coil to particular sections of said circuits.

12. An auxiliary resistance measuring set for use in connection with a line test set comprising a generator and a finder coil, two circuits for said auxiliary set with which the finder coil may be inductively coupled, and a member for rigidly supporting a section of each of said circuits and for preventing said finder coil from being coupled therewith except in one particular position.

13. An auxiliary resistance measuring set for use in connection with a line test set including a finder coil, two circuits for said auxiliary set, a member for supporting a section of each of said circuits with which the finder coil of said test set may be inductively coupled, and guiding means associated with said member for limiting the coupling of said finder coil with said sections to one particular position of the coil.

14. In a testing device for use with a finder coil, two conductors adapted to be temporarily inductively connected with the coil, means in the device for supporting said conductors parallel to each other, and means including said supporting means for insuring the same inductive relationship between the said conductors and the coil each time the coil is connected therewith.

15. The combination with a portable test set comprising a finder coil, receiver and generator for determining the direction of a fault on a line, of a portable auxiliary set comprising a known resistance and an induction balance adapted to cooperate with said finder coil and receiver for directly comparing the resistance of the line and fault with said known resistance, and circuit connections between said generator and said balance.

16. In an inductive testing device, two primary windings, a removable secondary winding, current detecting means connected to said secondary winding, guide members for controlling the coupling of said secondary winding with said primary windings, a terminal for connecting one primary winding to an unknown resistance, a variable resistance connected to the other primary winding, a source of current, and circuit connections for sending current from said source through said primary windings in opposite directions.

In witness whereof, I hereunto subscribe my name this 28th day of June, A. D. 1928.

CLARENCE A. ANDERSON.